April 30, 1935. C. E. GITHLER 1,999,173
THERMOMETER
Filed Jan. 3, 1933
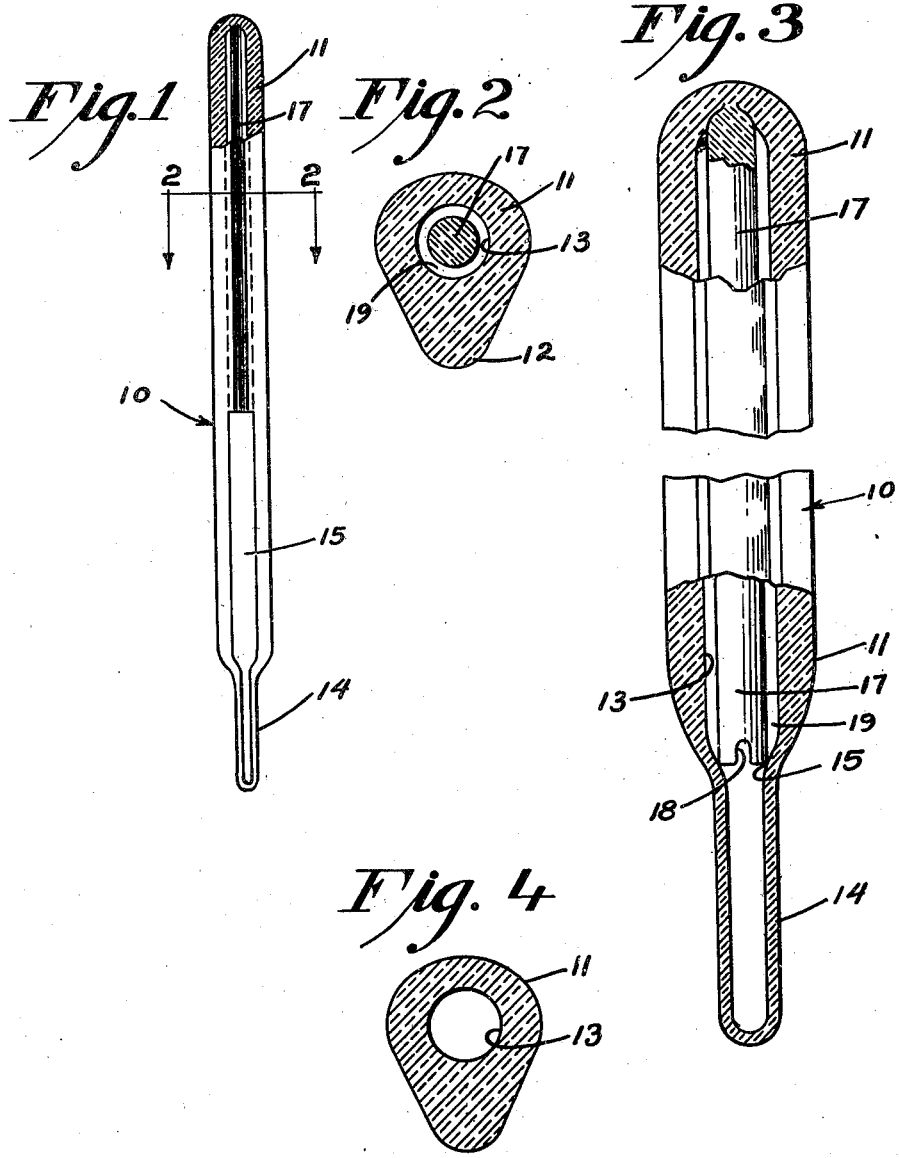
INVENTOR.
CHARLES E. GITHLER
BY Dorsey & Cole
ATTORNEYS.

Patented Apr. 30, 1935

1,999,173

UNITED STATES PATENT OFFICE 1,999,173

THERMOMETER

Charles E. Githler, Corning, N. Y., assignor to Corning Glass Works, Corning, N. Y., a corporation of New York Application January 3, 1933, Serial No. 649,985

1 Claim. (Cl. 73—52)

This invention relates to measuring instruments and tubing therefor and more particularly to thermometers and the tubing from which they are fabricated.

Thermometers such as are employed in industry and science and particularly clinical thermometers used in the medical profession are notoriously hard to read. By that I mean that it is very difficult for an unskilled person or one who is called upon at only infrequent intervals to take such readings to accurately determine the position of the mercury column on the scale. This is due to the failure of the bright reflective surface of the mercury which is usually employed as the thermally responsive substance to contrast with the smooth polished surfaces of the glass tubing from which the instruments are usually made.

The object of the present invention is to facilitate the reading of measuring instruments such as thermometers.

Another object is to simplify the manufacture of such instruments.

The above and other objects may be attained by employing my invention which embodies among its features drawing clear glass tubing of the desired cross-section with a relatively large bore, inserting a rod of contrasting glass in the bore and centering the rod in the bore so as to form a space between the rod and the wall of the bore to accommodate the column of indicating fluid.

In the drawing:

Fig. 1 is a front view in elevation of a thermometer constructed in accordance with my invention;

Fig. 2 is a horizontal sectional view on an enlarged scale taken on the line 2—2 of Fig. 1;

Fig. 3 is an enlarged fragmentary view of Fig. 1, the bulb and a portion of the stem being shown in section to more clearly illustrate the details of construction; and Fig. 4 is a view similar to Fig. 2 showing the tubing before the rod of contrasting glass has been inserted therein.

Referring to the drawing in detail, the thermometer designated generally 10 comprises a length of tubing 11 which is of substantially triangular cross-section and is formed with the usual lens front 12, at the focus of which is a relatively large bore 13. The tube 11 is provided at its lowermost end with the usual bulb 14 in which expansible fluid such as mercury is contained. Let into the bore 13 from its upper end and resting on a reduced portion 15 of the bore which is formed at the joint between the tube 11 and the bulb 14 is a rod 17 which is formed of glass, the color of which contrasts with that from which the tube 11 is made. In the present illustration the rod 17 is shown as being formed of red glass. The rod 17 is formed at its lower end with one or more transverse slots or notches 18 in order to allow the mercury 15 to pass from the bulb 14 into the tube 11 and fill the space 19 formed between the wall of the bore 13 and the rod 17. The rod 17 is supported at its upper end by softening the glass at the upper end of the tube 11 and sealing the two glasses together as shown in Fig. 3. This also seals off the upper end of the bore as is commonly done in the manufacture of thermometers. By thus supporting the rod 17 at opposite ends in the bore 13 it becomes evident that a space 19 is formed around the rod which receives the mercury when it expands in the bulb 14. Due to the relatively large size of the bore, thermometer tubing of this type can be readily drawn and its manufacture is considerably simplified as the bore may be pressed in the blank with comparative ease whereas in the manufacture of thermometer tubing in the usual way great care must be exercised in order to obtain a bore of the exact size and shape desired. Inasmuch as I propose to reduce the volumetric content of the bore by using the rod 17, it becomes evident that the manufacture of such tubing is greatly simplified as I need only to select a rod which will reduce the space 19 to the desired size.

In operation, the mercury rising in the space 19 which surrounds the rod will effectively cut off the view of the rod 17 below the upper end of the mercury column and consequently no color will appear below the mercury level, thus producing a sharply defined line at the mercury level which can be readily seen. By this means the height of the mercury within the instrument is rendered easily readable against the scale which may be engraved on the tube 11. Hence it becomes evident that the temperature may be easily and quickly determined even by a most inexperienced person.

While in the foregoing there has been shown and described the preferred embodiment of my invention, it is to be understood that minor changes in the details of construction, combination and arrangement of parts may be resorted to without departing from the spirit and scope of the invention as claimed.

What I claim is:

A thermometer which includes a transparent tube having a relatively large bore, a bulb at one end of the tube, there being a reduced portion at the joint of the tube and bulb, a rod of colored material having a notch in one end resting on the reduced portion, said rod being located in the bore in spaced relation to the walls thereof to form a passage therein and an opaque expansible fluid in the bulb, said fluid entering the passage through the notch in the rod and completely surrounding the rod so as to render that part of the rod which is covered by the fluid invisible.

CHARLES E. GITHLER.